(12) United States Patent
Wengert et al.

(10) Patent No.: US 12,735,064 B2
(45) Date of Patent: Sep. 15, 2026

(54) LATERAL CONTROLLER FOR AUTONOMOUS VEHICLES

(71) Applicant: TORC Robotics, Inc., Blacksburg, VA (US)

(72) Inventors: Nicolai Wengert, Blacksburg, VA (US); Florian Kuehnle, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 158 days.

(21) Appl. No.: 18/219,615

(22) Filed: Jul. 7, 2023

(65) Prior Publication Data

US 2025/0010880 A1 Jan. 9, 2025

(51) Int. Cl.
*B60W 30/045* (2012.01)
*B60W 60/00* (2020.01)

(52) U.S. Cl.
CPC ........ *B60W 60/001* (2020.02); *B60W 30/045* (2013.01); *B60W 2300/12* (2013.01); *B60W 2520/20* (2013.01); *B60W 2552/30* (2020.02); *B60W 2720/24* (2013.01)

(58) Field of Classification Search
CPC ............. B60W 30/045; B60W 60/001; B60W 2520/06; B60W 2520/10; B60W 2520/12; B60W 2520/14; B60W 2520/20; B60W 2552/30; B60W 2720/24
See application file for complete search history.

(56) References Cited

U.S. PATENT DOCUMENTS

2007/0021896 A1* 1/2007 O'Dea .................... B60T 8/172 701/1
2021/0213959 A1* 7/2021 Shahriari ............. G05D 1/0088
2022/0274602 A1* 9/2022 Zarringhalam ..... B60W 40/072
2023/0106644 A1* 4/2023 Shenfeld ............ G01C 21/3602 701/26
2023/0185304 A1* 6/2023 Wuthishuwong ............................ B60W 30/0956 701/26

FOREIGN PATENT DOCUMENTS

WO WO-2024110034 A1 * 5/2024 ............ B60W 30/12

* cited by examiner

*Primary Examiner* — Erin D Bishop
*Assistant Examiner* — Alex B Griffin
(74) *Attorney, Agent, or Firm* — Armstrong Teasdale LLP

(57) ABSTRACT

One or more processors of an autonomous vehicle can determine a surrogate trajectory for navigating the autonomous vehicle towards a target trajectory; generate a curvature target for the autonomous vehicle based on the surrogate trajectory, a lateral error, and a velocity of the autonomous vehicle, the curvature target defined in part by at least three points; and navigate the autonomous vehicle according to the curvature target.

20 Claims, 12 Drawing Sheets

Figure 3:
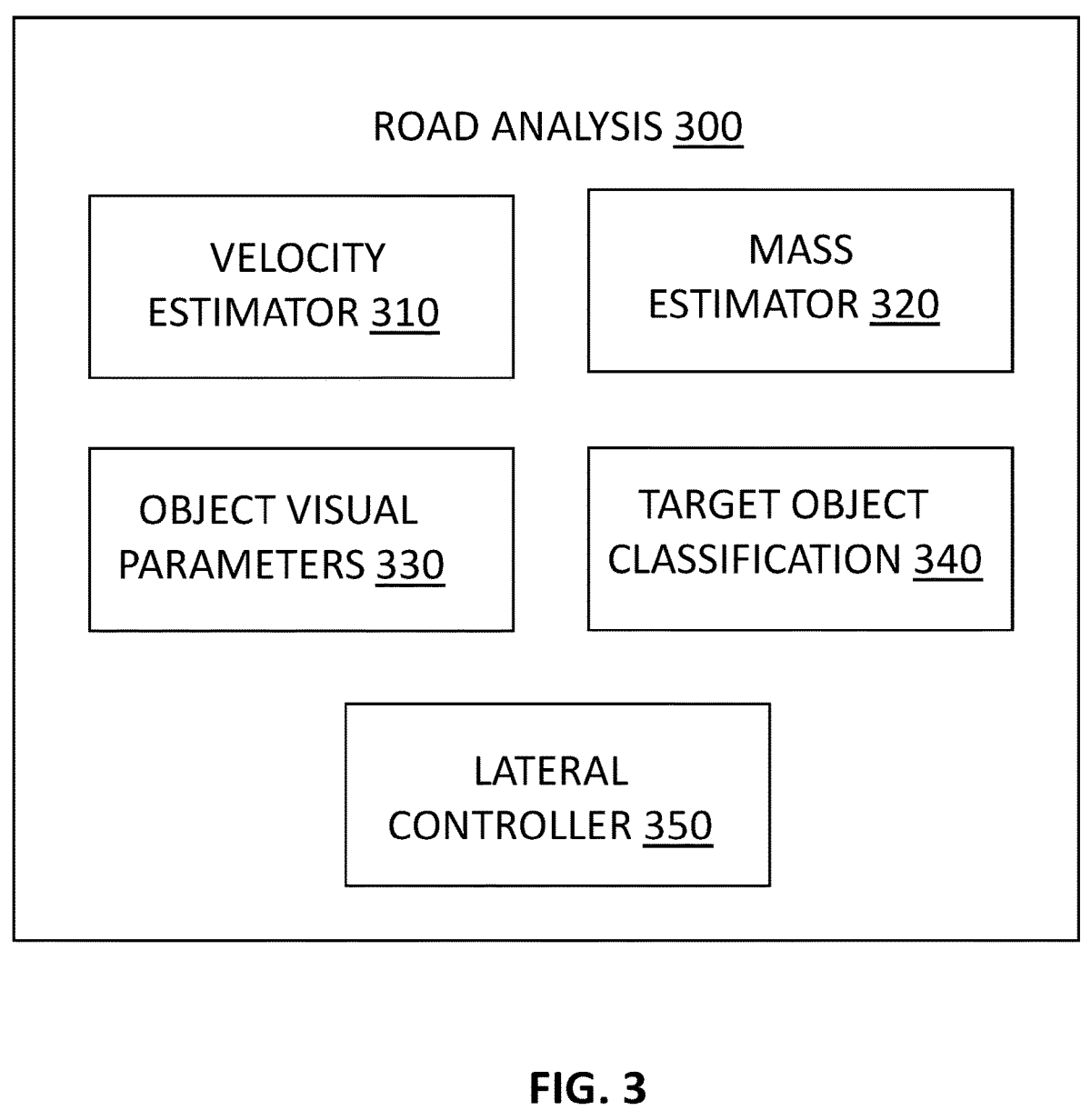

ROAD ANALYSIS 300

VELOCITY ESTIMATOR 310

MASS ESTIMATOR 320

OBJECT VISUAL PARAMETERS 330

TARGET OBJECT CLASSIFICATION 340

LATERAL CONTROLLER 350

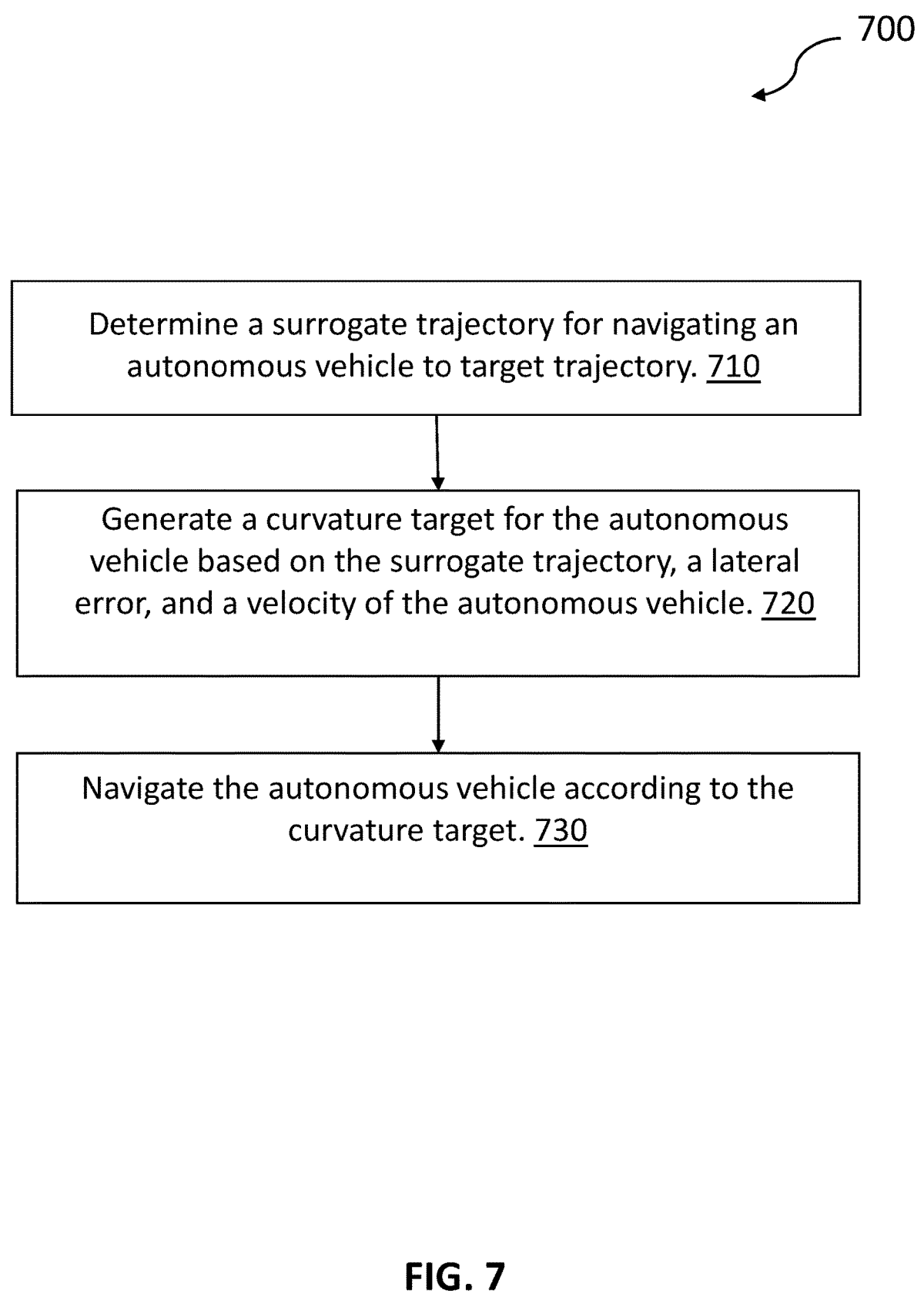

Determine a surrogate trajectory for navigating an autonomous vehicle to target trajectory. 710

Generate a curvature target for the autonomous vehicle based on the surrogate trajectory, a lateral error, and a velocity of the autonomous vehicle. 720

Navigate the autonomous vehicle according to the curvature target. 730

FIG. 7

LATERAL CONTROLLER FOR AUTONOMOUS VEHICLES

TECHNICAL FIELD

The present disclosure relates to autonomous vehicles and, more specifically, lateral controllers for autonomous vehicles.

BACKGROUND

The use of autonomous vehicles has become increasingly prevalent in recent years, offering numerous potential benefits. Autonomous vehicles may navigate in part by using a lateral controller. A lateral controller is a component of the autonomous vehicle's control system that is responsible for controlling the lateral, or side-to-side, movement of the vehicle. Lateral controllers maintain the desired position of the vehicle within a lane or a desired trajectory during autonomous driving. However, conventional lateral controllers are designed based on predefined rules and models that do not be adapt well to complex and dynamic driving scenarios.

SUMMARY

The systems and methods of the present disclosure attempt to solve the problems set forth above and/or other problems in the art. The scope of the current disclosure, however, is defined by the attached claims, and not by the ability to solve any specific problem.

Disclosed herein are implementations of a lateral controller for autonomous vehicles that enable the vehicles to adapt to complex and dynamic driving scenarios. In particular, the lateral controllers described herein enable larger vehicles, such as autonomous trucks, to safely navigate to a target trajectory without overshooting the trajectory via a "catch and release" controller paradigm. The catch and release controller implements two phases: the "catch" phase, where the vehicle steers towards the target trajectory in order to get closer to the target trajectory as quickly as possible, and a "release" phase, in which the autonomous vehicle drives towards the trajectory in a manner that aligns the autonomous vehicle along the target trajectory without crossing it.

One embodiment of the present disclosure is directed to a method. The method may be performed, for example, by one or more processors of an autonomous vehicle. The method includes determining, by one or more processors coupled to non-transitory memory, a surrogate trajectory for navigating an autonomous vehicle towards a target trajectory; generating, by the one or more processors, a curvature target for the autonomous vehicle based on the surrogate trajectory, a lateral error, and a velocity of the autonomous vehicle, the curvature target defined in part by at least three points; and navigating, by the one or more processors, the autonomous vehicle according to the curvature target.

The curvature target may be generated further based on a heading error. The heading error may be calculated based on an estimation of a slip angle. The slip angle may be estimated based on the velocity of the autonomous vehicle, a trajectory curvature, and a bank angle of a road upon which the autonomous vehicle may be operating. The surrogate trajectory may be determined based on a bank angle of a road upon which the autonomous vehicle may be operating.

The surrogate trajectory may be determined further based on a curvature of the road or a curvature of the target trajectory ahead of the autonomous vehicle. The method may include generating a steering command for the autonomous vehicle based on the curvature target. Navigating the autonomous vehicle may include causing the autonomous vehicle to align with the target trajectory. The lateral error may be determined based on a proportional-integral-differential (PID) function. The lateral error may be determined relative to a front axle or a reference point along a longitudinal axis of the autonomous vehicle.

Another embodiment of the present disclosure is directed to a system. The system includes one or more processors coupled to memory. The system can determine a surrogate trajectory for navigating an autonomous vehicle towards a target trajectory; generate a curvature target for the autonomous vehicle based on the surrogate trajectory, the curvature target defined in part by at least three points, a lateral error, and a velocity of the autonomous vehicle; and navigate the autonomous vehicle according to the curvature target.

The curvature target may be generated further based on a heading error. The heading error may be calculated based on an estimation of a slip angle. The slip angle may be estimated based on the velocity of the autonomous vehicle, a trajectory curvature, and a bank angle of a road upon which the autonomous vehicle may be operating. The surrogate trajectory may be determined based on a bank angle of a road upon which the autonomous vehicle may be operating.

The surrogate trajectory may be determined further based on a curvature of the road or a curvature of the target trajectory ahead of the autonomous vehicle. The system may generate a steering command for the autonomous vehicle based on the curvature target. The system may navigate the autonomous vehicle comprises by causing the autonomous vehicle to align with the target trajectory. The lateral error may be determined based on a PID function. The lateral error may be determined relative to front axle or a reference point along a longitudinal axis of the autonomous vehicle.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

FIG. 3 is a schematic diagram of a road analysis module of the autonomy system of an autonomous vehicle, according to an embodiment.

FIG. 7 is a flowchart diagram showing a method for implementing a lateral controller, according to an embodiment.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
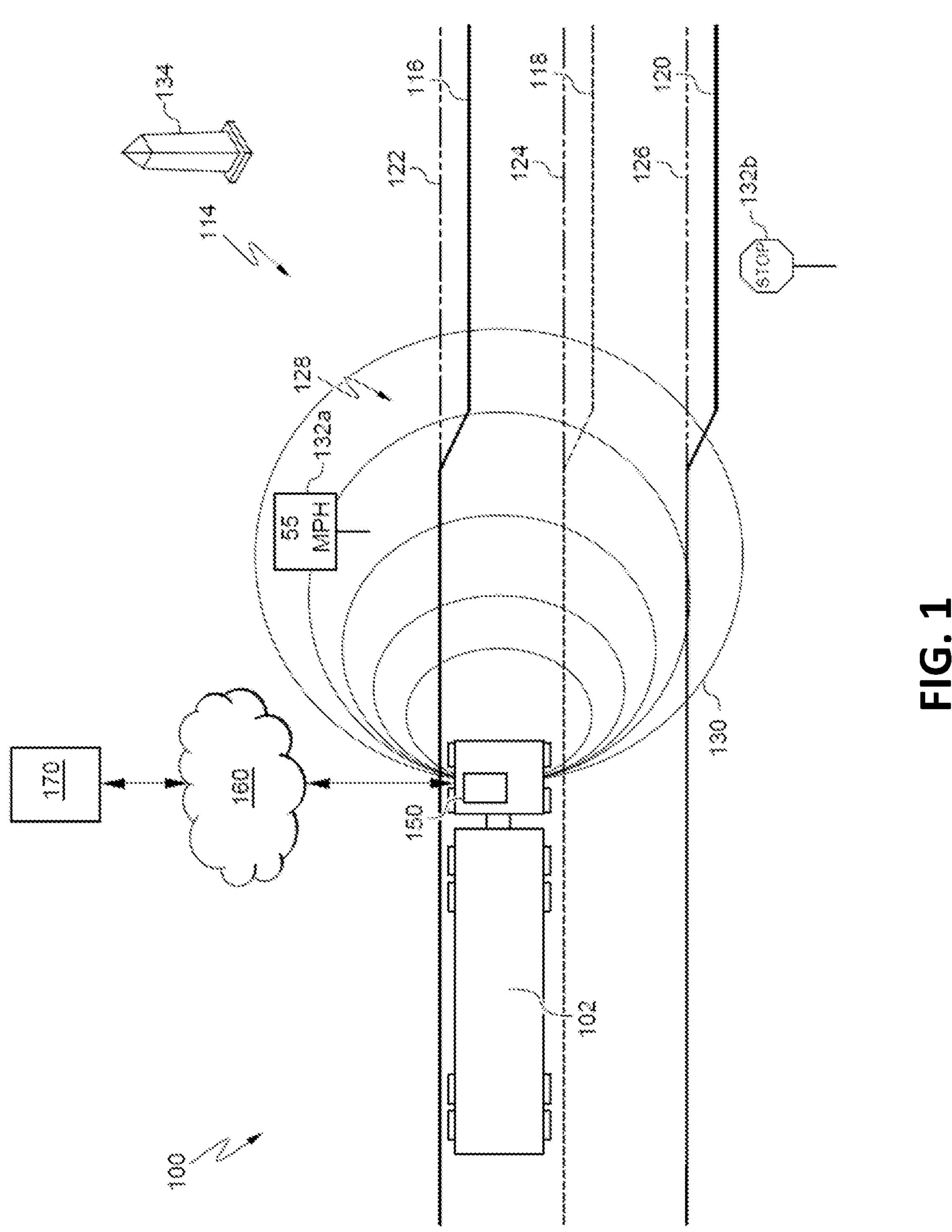
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of the truck 102 may be completely autonomous (fully autonomous), such as self-driving, driverless, or Level 4 autonomy, or semi-autonomous, such as Level 3 autonomy. As used herein, the term "autonomous" includes both fully autonomous and semi-autonomous. The present disclosure sometimes refers to autonomous vehicles as ego vehicles. The autonomy system 150 may be structured on at least three aspects of technology: (1) perception, (2) localization, and (3) planning/control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, signs, etc.) and features of the road (e.g., lane lines, shoulder lines, geometries of road features, lane types, etc.) around the truck 102, and classify the objects in the road distinctly.

The localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map. The digital map may be included as part of a world model, which the truck 102 utilizes to navigate. The world model may include the digital map data (which may be updated and distributed via the various servers described herein) and indications of real-time road features identified using the perception data captured by the sensors of the autonomous vehicle. In some implementations, map data corresponding to the location of the truck 102 may be utilized for navigational purposes. For example, map data corresponding to a predetermined radius around or a predetermined region in front of the truck 102 may be included in the world model used for navigation. As the truck 102 navigates a road, the world model may be updated to replace previous map data with map data that is proximate to the truck 102.

Once the systems on the truck 102 have determined its location with respect to the digital map features (e.g., location on the roadway, upcoming intersections, road signs, etc.), and the map data has been compared to locally identified road features to identify discrepancies, as described herein, and to update the world model, the truck 102 can plan and execute maneuvers and/or routes with respect to the features of the road. The planning/control aspects of the autonomy system 150 may be configured to make decisions about how the truck 102 should move through the environment to get to its goal or destination. It may consume information from the perception and localization modules to know where it is relative to the surrounding environment and what other objects and traffic actors are doing.

FIG. 1 further illustrates an environment 100 for modifying one or more actions of the truck 102 using the autonomy system 150. The truck 102 is capable of communicatively coupling with a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous, having varying degrees of autonomy or autonomous functionality. Further, the various sensors described in connection with the truck 102 may positioned, mounted, or otherwise configured to capture sensor data from the environment surrounding any type of vehicle.

Figure 2:
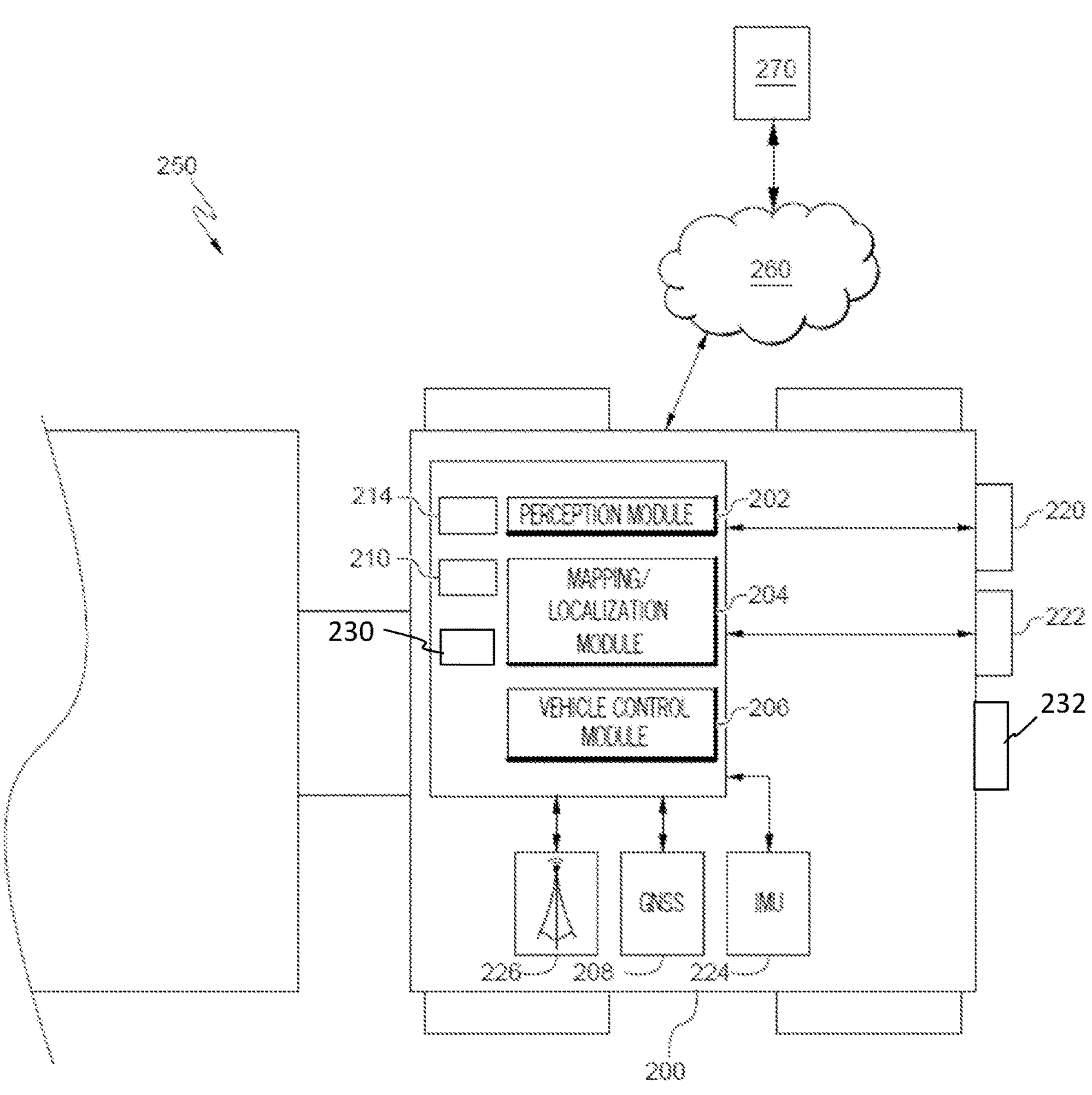
FIG. 2 is a schematic of the autonomy system of the vehicle, according to an embodiment.

With reference to FIG. 2, an autonomy system 250 of a truck 200 (e.g., which may be similar to the truck 102 of FIG. 1) may include a perception system including a camera system 220, a LiDAR system 222, a radar system 232, a GNSS receiver 208, an inertial IMU 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in many ways. As shown in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., ahead of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive laser rangefinding. The individual laser points can be emitted to and received from any direction such that LiDAR point clouds (or "LiDAR images") of the areas ahead of, to the side, and behind the truck 200 can be captured and stored. In some embodiments, the truck 200 may include multiple LiDAR systems, and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide variety of targets. In some embodiments, the LiDAR system 222 can be used to map physical features of an object with high resolution (e.g., using a narrow laser beam). In some examples, the LiDAR system 222 may generate a point cloud, and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor can process the received reflected data (e.g., raw radar sensor data).

The global navigation satellite system (GNSS) receiver 208 may be positioned on the truck 200 and may be configured to determine a location of the truck 200 via GNSS data, as described herein. The GNSS receiver 208 may be configured to receive one or more signals from a GNSS (e.g., global positioning system (GPS), etc.) to localize the truck 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, an acceleration, an angular rate, and/or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the truck 200 and predict a location of the truck 200 even when the GNSS receiver 208 cannot receive satellite signals.

The transceiver 226 may be configured to communicate with one or more external networks 260 via, for example, a wired or wireless connection to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) 260 via a wired connection, such as, for example, during initial installation, testing, or service of the autonomy system 250 of the truck 200. A wired/wireless connection may be used to download and install lines of code in the form of digital files (e.g., HD digital maps), executable programs (e.g., navigation programs), and other computer-readable code that may be used by the system 250 to navigate or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260, and updates which would otherwise be sent from the network 260 to the truck 200 may be stored at the network 260 until such time as the network connection is restored. In some embodiments, the truck 200 may deploy with all the data and software it needs to complete a mission (e.g., necessary perception, localization, and mission planning data) and may not utilize any connection to network 260 during the entire mission. Additionally, the truck 200 may send updates to the network 260 (e.g., regarding unknown or newly detected features in the environment as detected by perception systems) using the transceiver 226. For example, when the truck 200 detects differences between the perceived environment and the features on a digital map, the truck 200 may provide updates to the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single microprocessor or multiple microprocessors that may include means for identifying and reacting to differences between features in the perceived environment and features of the maps stored on the truck 200. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remotely from the system 250. For example, one or more features of the mapping/localization module 204 could be located remotely from the truck 200. Various other common circuit types may be associated with the autonomy system 250, including signal-conditioning circuitry, communication circuitry, actuation circuitry, and other appropriate circuitry.

Figure 4A:
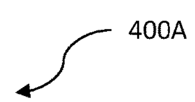
FIG. 4A is a dataflow diagram for an example process implemented by a lateral controller of an autonomous vehicle, according to an embodiment.
Figure 4A:
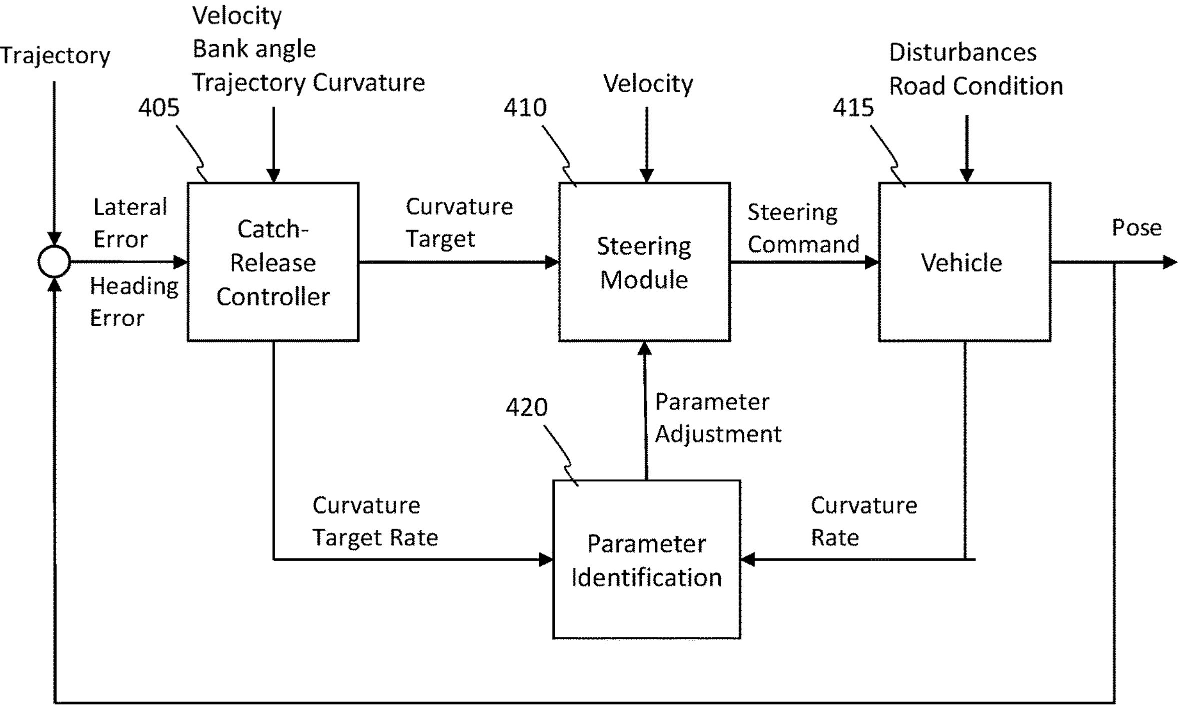
Figure 4B:
FIG. 4B is a dataflow diagram for an example process implemented by a catch-release controller shown in FIG. 4A, according to an embodiment.
Figure 4B:
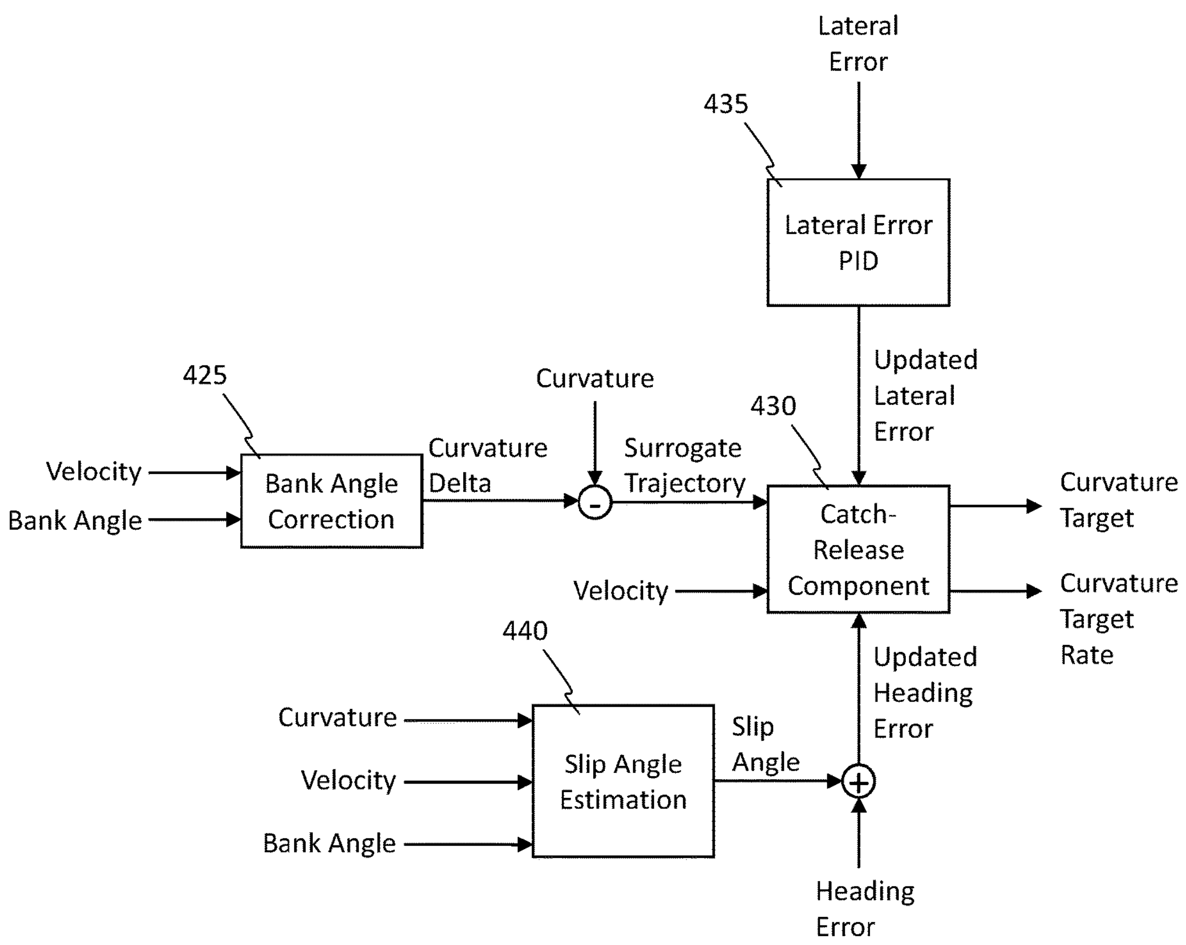

The memory 214 of autonomy system 250 may store data and/or software routines that may assist the autonomy system 250 in performing its functions, such as the functions of the perception module 202, the mapping/localization module 204, the vehicle control module 206, a road analysis module 300 of FIG. 3, the functions of the catch-release controller 405 of FIGS. 4A and 4B, and the method 700 of FIG. 7. The memory 214 may store one or more of any data described herein relating to digital maps, traffic conditions, and perception data or data generated therefrom, including any other vehicles on the roadway proximate to the truck 200 or traffic conditions at one or more autonomous vehicle hubs, which may be generated based on data (e.g., sensor data) captured via various components of the autonomous vehicle (e.g., the perception module 202, the processor 210, etc.). Further, the memory 214 may also store data received from various inputs associated with the autonomy system 250, such as perception data from the perception system.

As noted above, perception module 202 may receive input from the various sensors, such as camera system 220, LiDAR system 222, GNSS receiver 208, and/or IMU 224, (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, road signs, etc.) or features of the roadway 114 (e.g., intersections, lane lines, shoulder lines, geometries of road features, lane types, etc.) near a vehicle and classify the objects in the road. In some embodiments, the perception module 202 may include an image classification function and/or a computer vision function.

The system 150 may collect perception data. The perception data may represent the perceived environment surrounding the vehicle and may be collected using aspects of the perception system described herein. The perception data can come from, for example, one or more of the LiDAR systems 222, the camera system 220, and various other externally facing sensors and systems on board the vehicle (e.g., the GNSS receiver 208, etc.). For example, on vehicles having a sonar or radar system, the sonar and/or radar systems may collect perception data. As the truck 102 travels along the roadway 114, the system 150 may continually receive data from the various systems on the truck 102. In some embodiments, the system 150 may receive data periodically and/or continuously.

With respect to FIG. 1, the truck 102 may collect perception data that indicates a presence of the lane lines 116, 118, 120. The perception data may indicate the presence of a line defining a shoulder of the road. Features perceived by the vehicle should track with one or more features stored in a digital map (e.g., in the mapping/localization module 204) of a world model, as described herein. Indeed, with respect to FIG. 1, the lane lines that are detected before the truck 102 is capable of detecting the bend 128 in the road (that is, the lane lines that are detected and correlated with a known, mapped feature) will generally match with features in the stored map of the world model and the vehicle will continue to operate in a normal fashion (e.g., driving forward in the left lane of the roadway or per other local road rules). However, in the depicted scenario, the vehicle approaches a new bend 128 in the road that is not stored in locally stored map data because the lane lines 116, 118, 120 have shifted right from their original positions 122, 124, 126.

The system 150 may compare the collected perception data with the stored digital map data to identify errors (e.g., geometric errors or semantic errors) in the stored map data. The example above, in which lanes lines have shifted from an expected geometry to a new geometry, is an example of a geometric error of in the map data. To identify errors in the map data, the system may identify and classify various features detected in the collected perception data from the environment with the features stored in the data of the map data, including digital map data representing features proximate to the truck 102. For example, the detection systems may detect the lane lines 116, 118, 120 and may compare the geometry of detected lane lines with a corresponding expected geometry of lane lines stored in the digital map. Additionally, the detection systems could detect the road signs 132*a*, 132*b* and the landmark 134 to compare such features with corresponding semantic features in the digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 150 interacts with the various features. Based on the comparison of the detected features with the features stored in the digital map(s), the system 150 may generate a confidence level, which may represent a confidence of the vehicle in its location with respect to the features on a digital map and hence, its actual location. Additionally, and as described in further detail herein, the system 150 may transmit corrections or errors detected from the digital map to one or more servers, which can correct any inaccuracies or errors detected from the perception data.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters to classify portions, features, or attributes of an image. The image classification function may be embodied by a software module that may be communicatively coupled to a repository of images or image data (e.g., visual data and/or point cloud data) which may be used to detect and classify objects, road features, and/or features in real time image data captured by, for example, the camera system 220 and/or the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. Objects or road features detected via the computer vision function may include, but are not limited to, road signs (e.g., speed limit signs, stop signs, yield signs, informational signs, traffic signals such as traffic lights, signs, or signals that direct traffic such as right turn-only or no-right turn signs, etc.), obstacles, other vehicles, lane lines, lane widths, shoulder locations, shoulder width, or construction-related objects (e.g., cones, signs, construction-related obstacles, etc.), among others.

The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., its motion, size, etc.). The computer vision function may be embodied by a software module that may be communicatively coupled to a repository of images or image data (e.g., visual data and/or point cloud data), and may additionally implement the functionality of the image classification function. Objects detected in the environment surrounding the truck 200 may include other vehicles traveling on the road. Traffic conditions of the road upon which the truck 200 is traveling or adjacent roads can be determined based on an expected speed (e.g., a speed limit within predetermined tolerance range(s), etc.) of other vehicles (and the truck 200) and the current speed of the vehicles on the roadway. If the actual speed of vehicles on the road is less than the expected speed, it may be determined that there is traffic congestion on the roadway.

Mapping/localization module 204 receives perception data that can be compared to one or more digital maps stored in the mapping/localization module 204 to determine where the truck 200 is in the world and/or or where the truck 200 is on the digital map(s) when, for example, generating a world model for the environment surrounding the truck 200. In particular, the mapping/localization module 204 may receive perception data from the perception module 202 and/or from the various sensors sensing the environment surrounding the truck 200 and may correlate features of the sensed environment with details (e.g., digital representations of the features of the sensed environment) on the digital maps. The digital map may have various levels of detail and can be, for example, a raster map, a vector map, or the like. The digital maps may be stored locally on the truck 200 and/or stored and accessed remotely. In at least one embodiment, the truck 200 deploys with sufficiently stored information in one or more digital map files to complete a mission without connecting to an external network during the mission.

A centralized mapping system may be accessible via network 260 for updating the digital map(s) of the mapping/localization module 204, which may be performed, for example, based on corrections to the world model generated according to the techniques described herein. The digital map may be built through repeated observations of the operating environment using the truck 200 and/or trucks or other vehicles with similar functionality. For instance, the truck 200, a specialized mapping vehicle, a standard autonomous vehicle, or another vehicle can run a route several times and collect the location of all targeted map features relative to the position of the vehicle conducting the map generation and correlation.

The vehicle control module 206 may control the behavior and maneuvers of the truck 200. For example, once the systems on the truck 200 have determined its location with respect to stored map features (e.g., intersections, road signs, lane lines, etc.), the truck 200 may use the vehicle control module 206 and its associated systems to plan and execute maneuvers and/or routes with respect to the features of the environment. The vehicle control module 206 may make decisions about how the truck 200 will move through the environment to reach its goal or destination to complete its mission. The vehicle control module 206 may consume information from the perception module 202 and the maps/localization module 204 to know where it is relative to the surrounding environment and what other traffic actors are doing. Mission control data may include route information, which defines one or more destinations to which the autonomous vehicle is to travel to complete the route. The route may include a path within the map data that indicates which roads the vehicle can utilize to reach the destination(s). Mission control data, including routes, may be received from or queried by one or more servers via the network 260.

The vehicle control module 206 may be communicatively and operatively coupled to a plurality of vehicle operating systems and may execute one or more control signals and/or schemes to control operation of the one or more operating systems. For example, the vehicle control module 206 may implement any of the functionality described in connection with FIGS. 4A and 4B to control the lateral motion and position of the truck 200 during its operation. The vehicle control module 206 may do so to maintain the truck 200 along a predetermined trajectory during its operation. The trajectory may be stored in the memory 214 of the truck 200, and may be updated in real-time or near real-time by various components of the truck 200 based on mission-specific goals and any detected obstacles, vehicles, road geometry, or environmental factors.

The propulsion system may be configured to provide powered motion for the truck 200 and may include, for example, an engine/motor, an energy source, a transmission, and wheels/tires. The propulsion system may be coupled to and receive a signal from a throttle system, for example, which may be any combination of mechanisms configured to control the operating speed and acceleration of the engine/motor and, thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system, etc.).

The vehicle control module 206 may be configured to avoid obstacles in the environment surrounding the truck 200 and use one or more system inputs to identify, evaluate, and modify a vehicle trajectory. The vehicle control module 206 is depicted as a single module, but can be any combination of software agents and/or hardware modules capable of generating vehicle control signals operative to monitor systems and controlling various vehicle actuators. The vehicle control module 206 may include a steering controller for vehicle lateral motion control and a propulsion and braking controller for vehicle longitudinal motion. The vehicle control module 206 can control the truck 200 according to a predetermined route, which may be stored as part of a route information in the memory 214 of the system 250.

The system 150, 250 can collect perception data on objects corresponding to the road upon which the truck 200 is traveling, may be traveling in the future (e.g., an intersecting road), or a road or lane adjacent to that in which the truck 200 is traveling. Such objects are sometimes referred to herein as target objects. In an embodiment, road analysis module 230 executes one or more artificial intelligence models to predict one or more attributes (e.g., class, speed, etc.) of detected target objects (e.g., other autonomous vehicles, construction-related features such as cones, closed lanes), traffic congestion, or traffic jams. The artificial intelligence model(s) may be configured to ingest data from at least one sensor of the autonomous vehicle and predict the attributes of the object. In an embodiment, the artificial intelligence module is configured to predict a plurality of predetermined attributes of each of one or more target objects relative to the autonomous vehicle. The predetermined attributes may include a velocity of the respective target object relative to the autonomous vehicle and an effective mass attribute of the respective target object.

In an embodiment, the artificial intelligence model is a predictive machine learning model that may be continuously trained using continuously updated data, such as relative velocity data, mass attribute data, target object classification data, and road feature data. In various embodiments, the artificial intelligence model(s) may be predictive machine-learning models that are trained to determine or otherwise generate predictions relating to road geometry. For example, the artificial intelligence model(s) may be trained to output predictions of lane width, relative lane position within the road, the number of lanes in the road, whether the lanes or road bend and to what degree the lanes or road bend, to predict the presence of intersections in the road, or to predict the characteristics of the shoulder of the road (e.g., presence, width, location, distance from lanes or vehicle, etc.). In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

FIG. 3 shows a road analysis module 300 of system 150, 250. The road condition analysis module 300 includes velocity estimator 310, effective mass estimator 320, object visual parameters component 330, target object classification component 340, and the lateral controller 350. These components of road analysis module 300 may be either or both software- and hardware-based components.

Velocity estimator 310 may determine the velocity of target objects relative to the ego vehicle. Effective mass estimator 320 may estimate effective masses of target objects, for example, based on object visual parameters signals from object visual parameters component 330 and object classification signals from target object classification component 340. Object visual parameters component 330 may determine visual parameters of a target object such as size, shape, visual cues, and other visual features in response to visual sensor signals and generate an object visual parameters signal. By comparing the velocity of target objects in the environment to an expected velocity associated with the road (e.g., a speed limit), the road condition analysis module 300 can detect the presence of traffic congestion or a traffic jam proximate to the ego vehicle.

Target object classification component 340 may determine a classification of a target object using information contained within the object visual parameters signal, which may be correlated to various objects and generate an object classification signal. For instance, the target object classification component 340 can determine whether the target object is a plastic traffic cone, an animal, a road sign, or another type of traffic- or road-related feature. Target objects may include moving objects, such as other vehicles, pedestrians, or cyclists in the proximal driving area. Target objects may include fixed objects such as obstacles; infrastructure objects such as rigid poles, guardrails, or other traffic barriers; and parked cars. Fixed objects, also referred to herein as static objects or non-moving objects, can be infrastructure objects as well as temporarily static objects such as parked cars, construction equipment, or temporarily closed lanes.

The target object classification component 340 can determine additional characteristics of the road, including but not limited to characteristics of signs (e.g., speed limit signs, stop signs, yield signs, informational signs, signs or signs that direct traffic such as right-only or no-right turn signs, etc.), traffic signals, as well as geometric information relating to the road. The target object classification component 340 can execute artificial intelligence models, for example, which receive sensor data (e.g., perception data as described herein, pre-processed sensor data, etc.) as input and generate corresponding outputs relating to potential traffic conditions indicated in the sensor data.

The sensor data may include, in one example, a speed of the ego vehicle, the expected speed of the roadway upon which the ego vehicle is traveling, and predicted velocity values of other vehicles traveling on the same road as the ego vehicle. In some implementations, only perception data (e.g., one or more images, sequences of images, LiDAR data, radar data, etc.) may be provided as input to the artificial intelligence models. The artificial intelligence models may be trained to output a classification of a traffic condition proximate to the ego vehicle, such as the presence of a traffic jam, traffic congestion, or an absence of traffic.

Externally facing sensors may provide system 150, 250 with data defining distances between the ego vehicle and target objects or road features in the vicinity of the ego vehicle and with data defining direction of target objects from the ego vehicle. Such distances can be defined as distances from sensors, or sensors can process the data to generate distances from the center of mass or other portion of the ego vehicle. The externally facing sensors may provide system 150, 250 with data relating to lanes of a multi-lane roadway upon which the ego vehicle is operating. The lane information can include indications of target objects (e.g., other vehicles, obstacles, etc.) within lanes, lane geometry (e.g., number of lanes, whether lanes are narrowing or ending, whether the roadway is expanding into additional lanes, etc.), or information relating to objects adjacent to the lanes of the roadway (e.g., objects or vehicles on the shoulder, on-ramps, or off-ramps, etc.).

In an embodiment, the system 150, 250 collects data relating to target objects or road features within a predetermined region of interest (ROI) in proximity to the ego vehicle. Objects within the ROI may satisfy predetermined criteria for distance from the ego vehicle. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, making swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

In an embodiment, the system 150, 250 can generate a high-definition (HD) map, at least portions of which may be incorporated into a world model used by the autonomous vehicle to navigate. The system 150, 250 may generate an HD map by utilizing various data sources and advanced algorithms. The data sources may include information from onboard sensors, such as cameras, LiDAR, and radar, as well as data from external sources, such as satellite imagery and information from other vehicles. The system 150, 250 may collect and process the data from these various sources to create a high-precision representation of the road network.

The system 150, 250 may use computer vision techniques, such as structure from motion, to process the data from onboard sensors and create a three-dimensional (3D) model of the environment. This model may then be combined with the data from external sources to create a comprehensive view of the road network.

The system 150, 250 may also apply advanced algorithms to the data, such as machine learning and probabilistic methods, to improve the detail of the road network map. The algorithms may identify features, such as lane markings, road signs, traffic lights, and other landmarks, and label them accordingly. The resulting map may then be stored in a format that can be easily accessed and used by the components of the ego vehicle. The system 150, 250 may use real-time updates from the vehicle's onboard sensors to continuously update the HD map data as the vehicle moves, as described herein. This enables the vehicle to maintain an up-to-date representation of its surroundings and respond to changing conditions in real-time or near real-time.

The lateral controller 350 can control the lateral movement of the ego vehicle to maintain the position of the ego vehicle within a lane or along desired trajectory during autonomous operation. To do so, the lateral controller 350 can utilize sensor data captured by the sensors of the autonomous vehicle, such as cameras, LiDAR, radar, and/or GNSS sensors, to perceive the position of the ego vehicle relative to the road and surrounding environment. The sensor data can be utilized to identify one or more features of the road (e.g., lane lines, shoulder lines, geometries of road features, lane types, etc.) as described herein, which may be utilized in part to define a target trajectory for the autonomous vehicle.

The target trajectory may be determined based on input from any number of components of the autonomous vehicle. In one embodiment, the target trajectory may be determined as a trajectory that maintains the ego vehicle in the middle of the lane in which it is traveling. In some implementations, the target trajectory may be generated to cause the ego vehicle to change from one lane to another lane, or to navigate through an intersection. Once the target trajectory has been determined, the lateral controller 350 can implement any of the functionality described in connection with FIGS. 4A and 4B to control the lateral position of the ego vehicle to align with the target trajectory. As used herein, the target trajectory may be referred to as a "target trajectory."

FIG. 4A is a dataflow diagram for an example process 400A implemented by a lateral controller of an autonomous vehicle 415, according to an embodiment. The process 400A may be implemented by any computing system described herein, including the system 150, the system 250, or the road analysis module 300, among others. To process 400A can execute the catch-release controller 405 to calculate a curvature target from input lateral error and heading error. The lateral error is the distance between the vehicle reference frame and a most near point on the trajectory. The heading error is the angle difference between the vehicle's driving direction and the tangent of the trajectory (at the nearest point). Further details of the catch-release controller 405 are described in connection with the process of FIG. 4B.

The curvature target generated by the catch-release controller 405 a steering command in a steering module 410 containing a steering gradient provided in an inverse model of the autonomous vehicle 415. The steering gradient corresponds to the sensitivity of the steering response of the autonomous vehicle 415 in response to changes in target trajectory. The steering gradient can quantify the relationship between the desired trajectory and the required steering angle or control input. A higher steering gradient indicates a more significant change in the steering angle for a given change in the desired trajectory, while a lower steering gradient suggests a more gradual response.

The steering command can be a command that may be implemented by the autonomous vehicle 415. The autonomous vehicle 415 can receive inputs from various sensors of the autonomous vehicle 415, including any disturbances or road conditions, and implement the steering command by transmitting signals to one or more of a vehicle steering system, a propulsion system, and/or a braking system to perform the steering command to adjust the lateral position of the autonomous vehicle 415 as it operates. This results in a new pose for the autonomous vehicle 415, which is compared to the target trajectory, as shown, to produce a next iteration of the lateral error and heading error.

In some implementations, and as shown in this example, the steering gradient can be adapted by a parameter identification component 420 which uses the ratio between commanded steering and resulting cornering to generate a parameter adjustment factor. The parameter adjustment factor can be generated based on the sensed curvature rate of the vehicle steering system provided via the lateral vehicle dynamics component and the target curvature rate generated by the catch-release controller 405. The parameter adjustment factor can be provided as input to the inverse model, along with the current velocity of the autonomous vehicle 415, to generate the steering gradient used to produce the steering command(s).

Referring to FIG. 4B, illustrated is a dataflow diagram for an example process implemented by a catch-release controller 405 shown in FIG. 4A, according to an embodiment. As shown, the inputs to the catch-release controller 405 include the detected bank angle of the road upon which the autonomous vehicle is driving, the velocity of the autonomous vehicle, the lateral error and the heading error (each determined based on the current pose of the autonomous vehicle and the target trajectory, as shown in FIG. 4A), and the curvature of the target trajectory at a distance ahead of the autonomous vehicle (sometimes referred to herein as the "curvature ahead"). The outputs of the catch-release controller 405 include a curvature target and a curvature target rate, which are provided as input to the inverse model to calculate the steering gradient and the parameter identification component 420, as shown in FIG. 4A.

The catch-release controller 405 includes the catch release component 430, which generates the outputs of the catch-release controller 405 (e.g., the curvature target and the curvature target rate). The curvature target (sometimes referred to as the "target curvature) can be calculated based on at least three points, which are used to approximate a circle. The curvature target can be calculated as the inverse of that the radius of that circle. In some implementations, the three points may be defined by a location of a feature of the autonomous vehicle, an expected position of the autonomous vehicle after a predetermined period of time based on the current velocity of the autonomous vehicle, and a location defined based on the target trajectory. An example diagram showing the phases implemented by the catch-release controller 405 are shown in FIGS. 5A and 5B, which define the three points.

Figure 5A:
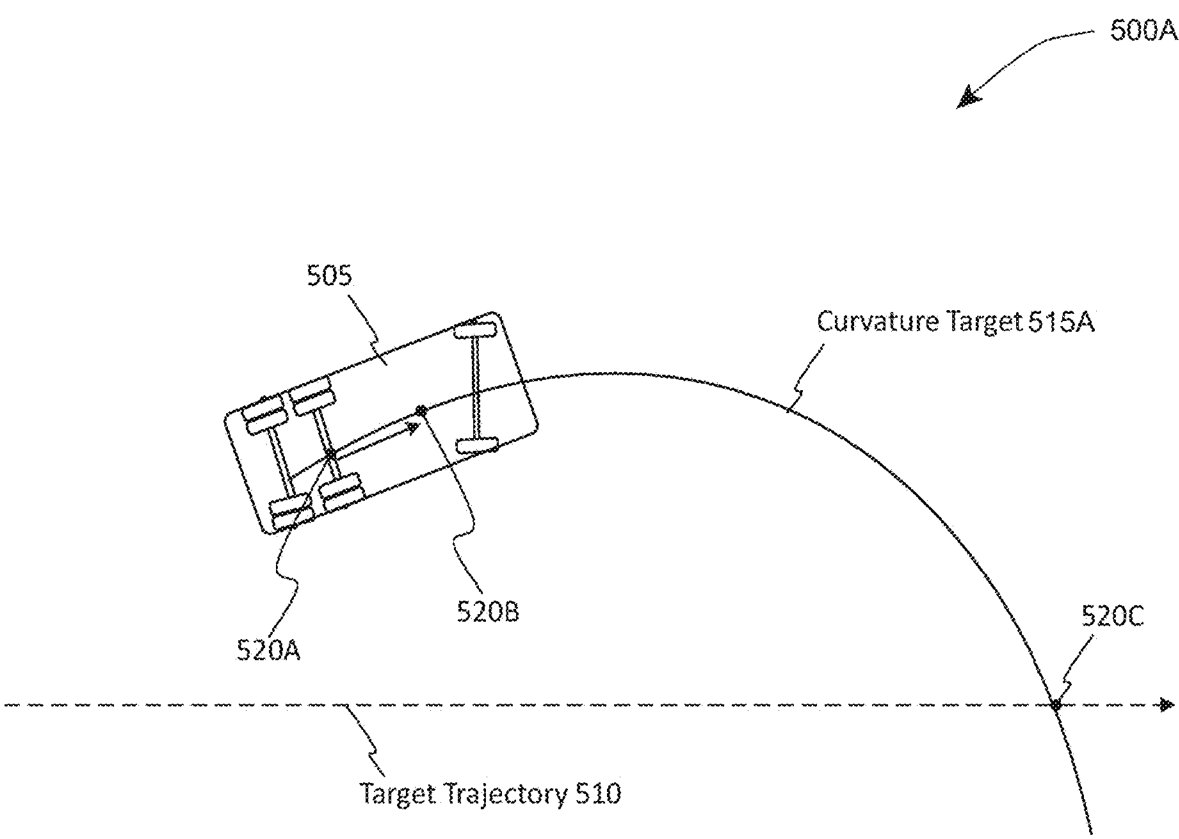
FIGS. 5A and 5B show example diagrams showing catch and release functionality to correct lateral errors according to the techniques described herein, according to an embodiment.
Figure 5B:
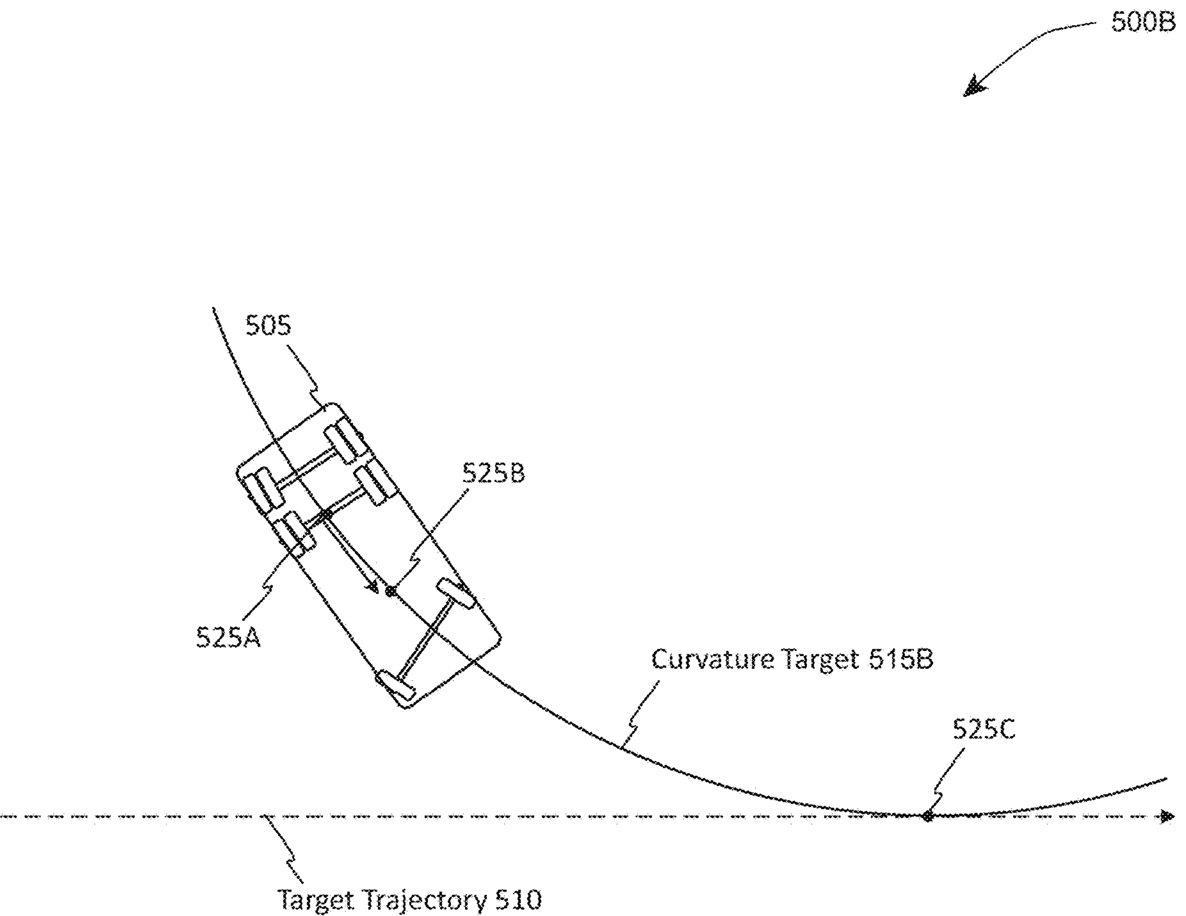

Referring FIGS. 5A and 5B, illustrated are example diagrams 500A and 500B showing catch and release functionality, respectively, to correct lateral errors according to the techniques described herein, according to an embodiment. Referring to FIG. 5A in the context of the components described in connection with FIGS. 4A and 4B, illustrated is the "catch" phase implemented by the catch-release controller 405. The catch phase can be implemented when the catch-release controller 405 detects that the autonomous vehicle 505 is driving away from the target trajectory 510, and therefore defines the curvature target 515A to direct the autonomous vehicle 505 back to the target trajectory 510. As shown, the curvature target 515A is defined based on the points 520A, 520B and 520C, which are identified as a point 520A on the center of the rear axle of the autonomous vehicle 505, a point 520B at which the center of the rear axle of the autonomous vehicle 505 will be positioned as the autonomous vehicle 505 continues at its current velocity, and a point 520C on the target trajectory 510 that the autonomous vehicle 505 is to navigate to. Once the heading of the autonomous vehicle 505 is directed towards the target trajectory 510, the catch-release controller 405 can implement the release phase of the catch-release lateral control process.

Referring to FIG. 5B in the context of the components described in connection with FIGS. 4A and 4B, illustrated is the "release" phase implemented by the catch-release controller 405. The release phase of the catch-release lateral control process causes the autonomous vehicle 505 to steer away from the target trajectory 510 in order to avoid overshooting. The release phase can guide the autonomous along a target curvature 515B such that the autonomous vehicle does not overshoot the target trajectory 510 and is instead aligned such that the autonomous vehicle 505 travels along the target trajectory.

As shown, the curvature target 515B is defined based on the points 525A, 525B and 525C, which are identified as a point 525A on the center of the rear axle of the autonomous vehicle 505, a point 525B at which the center of the rear axle of the autonomous vehicle 505 will be positioned as the autonomous vehicle 505 continues at its current velocity, and a point 525C on the target trajectory 510 that the autonomous vehicle 505 is to navigate to. The release phase may be implemented once the heading of the autonomous vehicle 505 is directed towards the target trajectory 510. Once the autonomous vehicle 505 is determined to align with the target trajectory 510, the autonomous vehicle 505 can be navigated until a deviation is detected.

Referring back to FIG. 4B, the catch release component 430 of the catch-release controller 405 is shown as receiving inputs including a surrogate trajectory, the velocity of the autonomous vehicle, an updated lateral error generated by the lateral error PID component 435, and an updated heading error updated in part based on the slip angle estimation component 440. As shown, the catch-release controller 405 provides the current velocity of the autonomous vehicle and the bank angle of the road upon which the autonomous vehicle is traveling as input to the bank angle correction component 425. The bank angle correction component generates a curvature delta. The curvature delta corresponds to the curvature the autonomous vehicle would drive due to a banked road (at zero steering). The bank angle correction component 425 calculates the curvature delta according to the following formula, based on the parameter $p_{c,\phi}$:

$$c_{bank\_angle} = p_{c,\phi}\phi_{road} \approx p_{c,\phi}\phi_{vehicle},$$

where $c_{bank\_angle}$ is the curvature delta, the parameter $p_{c,\phi}$ is a predetermined parameter defining the curve induced at the autonomous vehicle due to the bank angle of the road ($\phi_{road}$), which is roughly equal to the roll angle of the vehicle ($\phi_{vehicle}$).

As shown, the curvature delta is subtracted from the curvature ahead of the autonomous vehicle (e.g., the curvature of a point on the target curvature 515A and target curvature 515B shown in FIGS. 5A and 5B) to calculate the surrogate trajectory. Calculation of the surrogate trajectory may be performed according to the following formula:

$$c_{corrected} = c_{trajectory\_ahead} - c_{bank\_angle},$$

where $c_{corrected}$ is the surrogate trajectory, $c_{trajectory\_ahead}$ is the curvature of a point ahead of the autonomous vehicle along the target trajectory (e.g., the curvature ahead), and $c_{bank\_angle}$ is the trajectory caused by the bank angle without steering, as described above. In some implementations, rather than generating a surrogate trajectory to compensate for the bank angle, the steering command itself may be corrected based on the bank angle. For example, rather than generating $c_{corrected}$, the value(s) of $c_{trajectory\_ahead}$ can be utilized to generate a steering command, which may be adjusted following generation to compensate for the bank angle of the road. Additionally, in some implementations, the target trajectory itself may be to generate the steering command without necessarily compensating for the bank angle. An example showing the calculation of a surrogate trajectory is shown in FIG. 6A.

Figure 6A:
FIGS. 6A, 6B, 6C, and 6D show example diagrams showing navigation based on the lateral controller described herein, according to an embodiment.
Figure 6A:
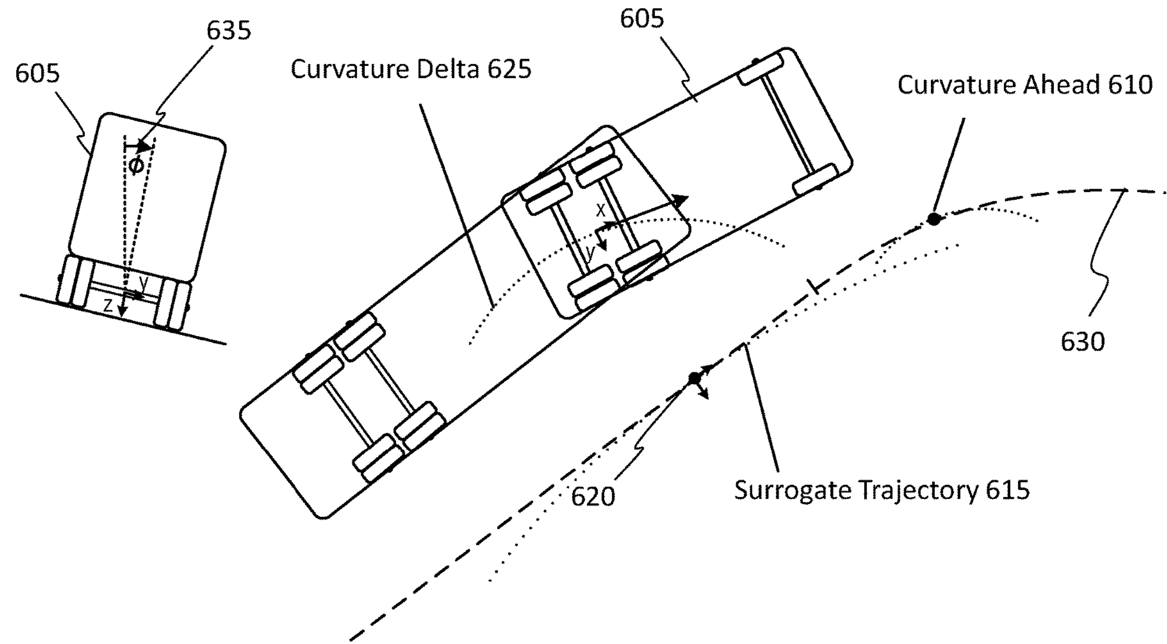

Referring to FIG. 6A in the context of the components described in connection with FIGS. 4A and 4B, illustrated is an example diagram 600A showing an example representation of the surrogate trajectory 615, which is determined based on a reference point 620 on the target trajectory 630. As shown, the curvature delta 625 calculated as described herein is utilized with the curvature of a point ahead 610 (e.g., the curvature ahead) along the target trajectory 630 to determine the surrogate trajectory 615. The roll angle 635 of the autonomous vehicle 605 roughly approximates bank angle of the road, as described herein.

Referring back to FIG. 4B, as shown, the catch release component 430 can use the surrogate trajectory and the velocity to determine a distance along the determined circle for the surrogate trajectory, starting at the reference point, that the autonomous vehicle is to navigate to arrive at the target trajectory. The distance may be a function of the velocity of the autonomous vehicle and of the length of the radius of the circle determined for the surrogate trajectory, as described herein. The use of the surrogate trajectory enables the autonomous vehicle to compensate for any type of bank angle of the roadway while navigating towards the target trajectory. To do so, the points for the curvature target can be determined based on when the autonomous vehicle will intersect with the surrogate trajectory. Example determination of such points is shown in FIG. 6B.

Figure 6B:
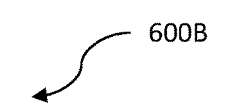
Figure 6B:
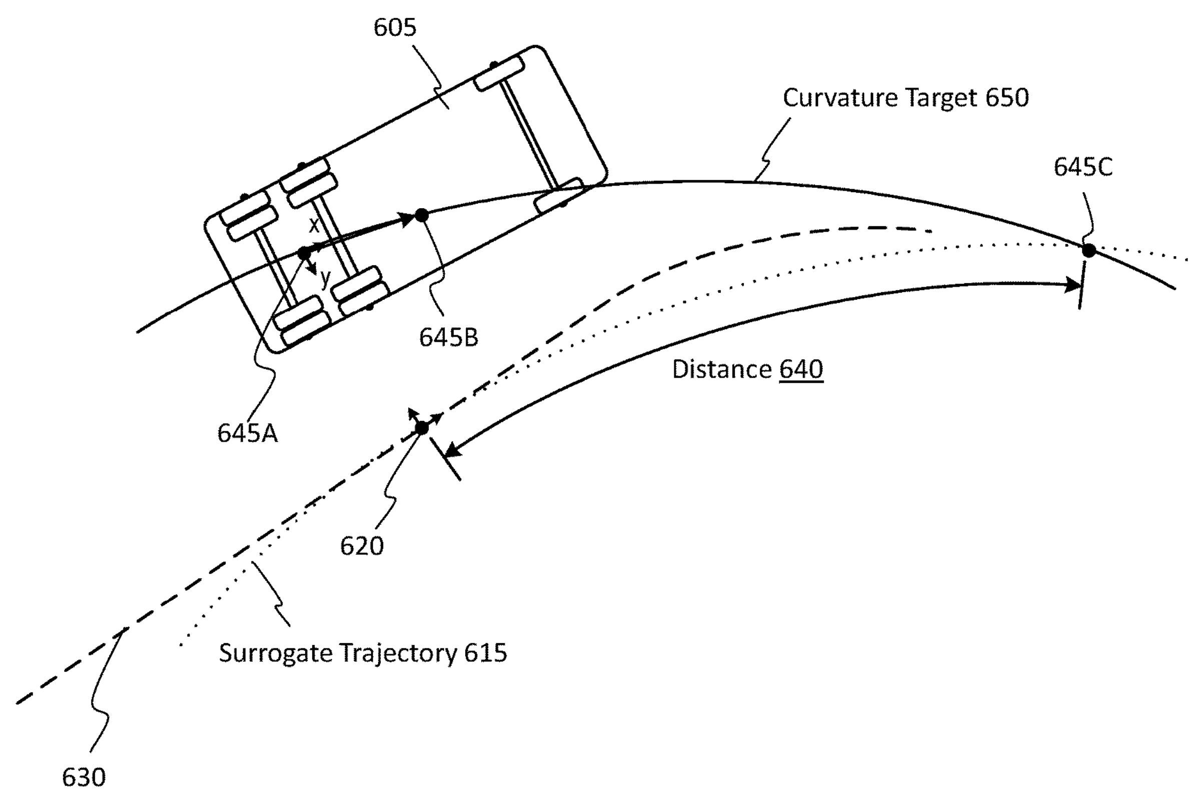

Referring to FIG. 6B in the context of the components described in connection with FIG. 4B, illustrated is an example diagram showing the determination of points to define a curvature target based on the surrogate trajectory, as described herein. As shown, the reference point 620 may be selected as the closest point on the surrogate trajectory to the first point 645A that defines the circle corresponding to the curvature target 650. As described herein, the first point 645A is a point at center of the rear axle of the autonomous vehicle 605 and the second point 645B is a point at which the center of the rear axle of the autonomous vehicle 605 will be positioned as the autonomous vehicle 505 continues at its current velocity.

The third point 645C of the curvature target 650 can be determined based on the distance 640 along the surrogate trajectory 615 (determined from the target trajectory 630, as described herein) based on the current velocity of the autonomous vehicle 605 multiplied by a desired amount of time (e.g., determined based on various navigational components of the autonomous vehicle 605) after which the autonomous vehicle is to arrive at the surrogate trajectory 615. In some implementations, the distance 640 may be determined via parameterization. For example, the distance 640 may be determined according to velocity-dependent or curvature-dependent parameters.

Referring back to FIG. 4B, the catch release component 430 further utilizes an updated lateral error and an updated heading error to determine the target curvature output. As shown, the lateral error PID component 435 receives the lateral error between the autonomous vehicle and the target trajectory (e.g., determined based on perception data, as described herein) and generates an updated lateral error. In some implementations, the lateral error is the distance between the center of the front axle of the autonomous vehicle and the closest point along the target trajectory to the center of the front axle of the autonomous vehicle. The updated lateral error is determined by the lateral error PID component 435 using a composition of a proportional (P) part of the lateral error, an integral (I) part of the lateral error, and a differential (D) part of the lateral error. An example equation that may be solved according to various PID controller process to generate the updated lateral error is provide below:

$$e_{lat\_updated} = k_P e_{lat} + k_I \int e_{lat} dt + k_D(v) \frac{de_{lat}}{dt},$$

In the equation above, $e_{lat\_updated}$ is the updated lateral error, $k_P$ is a constant for the proportional portion of the composition, $e_{lat}$ is the input lateral error, $k_I$ is a constant for the integral portion of the composition, and the function $k_D(v)$ is a value generated based on the velocity v for the differential portion of the composition. The PID relationship may be iteratively updated and solved by the lateral error PID component 435 as the autonomous vehicle navigates, to provide an updated lateral error for use in calculating the curvature target as described herein. An example representation of how the updated lateral error may differ from the detected lateral error is shown in FIG. 6C.

Figure 6C:
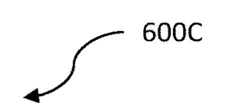
Figure 6C:
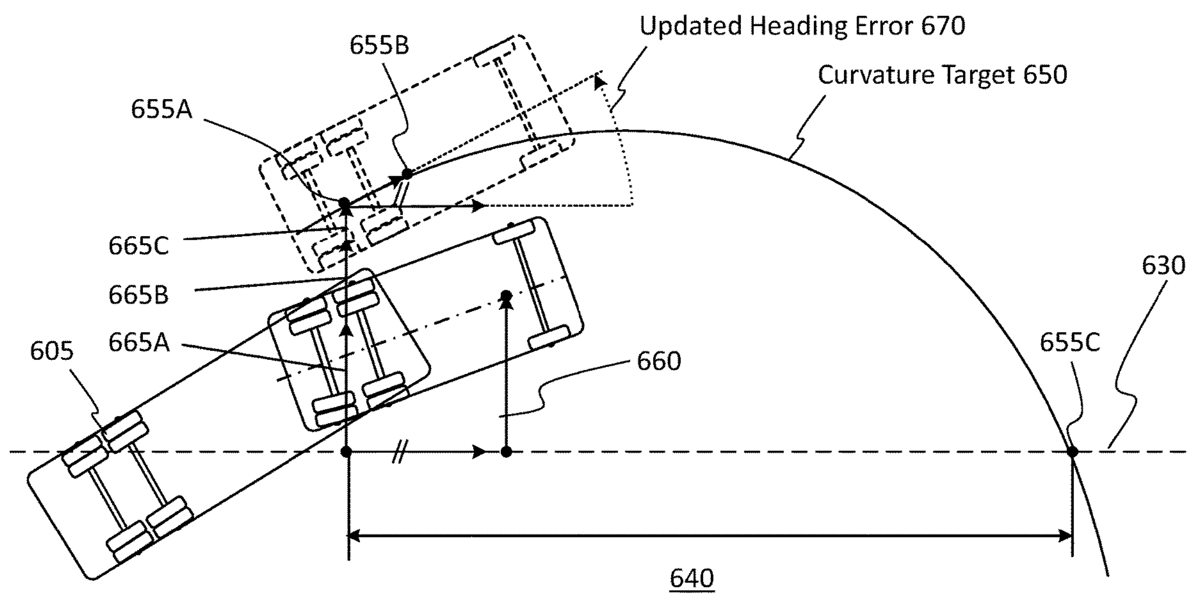

Referring to FIG. 6C, illustrated is an example diagram 600C showing how the determination of an updated lateral error, in accordance with the techniques described herein, affects generation of the curvature target 650. As shown, the lateral error 660 is the distance between the autonomous vehicle and the closet point to the target trajectory. However, rather than utilizing the lateral error 660 to determine the points 655A, 655B, and 655C for the target curvature 650, the updated lateral error is utilized, which includes the proportional component 665A, the integral component 665B, and the differential component 665C, summed together. As shown, by using the updated lateral error, the position of the point 665A can be determined (e.g., based on the closest point on the rear axle of the autonomous vehicle 605). Using the updated heading error (described in further detail here), the point 655B can be determined. The third point 655C of the curvature target 650 can be determined based on the distance 640 along the trajectory 630 based on the current velocity of the autonomous vehicle 605 multiplied by a desired amount of time (e.g., determined based on various navigational components of the autonomous vehicle 605) after which the autonomous vehicle is to arrive at the target trajectory 630. Although not shown here for visual simplicity, a surrogate trajectory may be calculated to compensate for the bank angle, as described herein.

Referring back to FIG. 4B, the updated heading error can be calculated based on the sum of the heading error and the slip angle at the reference frame, according to the equation provided below:

$$e_{\psi,updated} = e_{\psi} + \beta_{veh},$$

where $e_{\psi,updated}$ is the updated heading error, $e_{\psi}$ is the input heading error (calculated based on the current pose of the vehicle and the target trajectory, as shown in FIG. 4A), and $\beta_{veh}$ is the slip angle of the autonomous vehicle. The slip angle can be calculated by the slip angle estimation component 440. In some implementations, the heading error may be calculated based on a proportional and/or differential function (e.g., a PD function), which may be utilized to calculate heading error that is added to the slip angle at the reference frame to generate the updated heading error. In some implementations, rather than utilizing the updated heading error, the course angle of the autonomous vehicle may be utilized as input to the catch-release An example diagram showing the calculation of the updated heading error is shown in FIG. 6D.

Figure 6D:
Figure 6D:
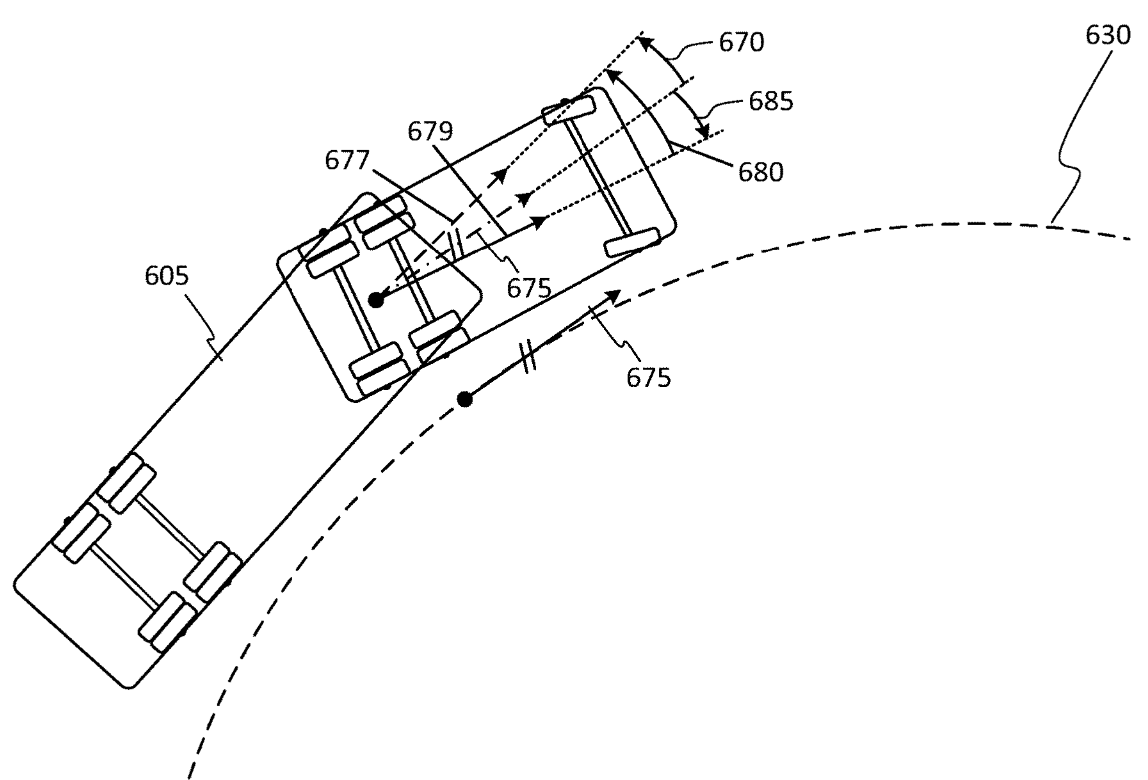

Referring to FIG. 6D, illustrated is an example diagram 600D showing how the slip angle is utilized to generate an updated heading error. As described herein, the slip angle 680 is an angle by which the autonomous vehicle may slip due to driving a curve as well as the bank angle of the road upon which it is traveling. To compensate for this error, the slip angle is added to the heading error 685 determined based on the pose of the vehicle and the trajectory heading 675 of the target trajectory 630 at a point on the target trajectory 630 to the center of the rear axle of the autonomous vehicle 605. The velocity vector 677 corresponding to the updated heading error 670 is then calculated to determine the second point on the target curvature, as described herein. As shown, the velocity vector 677 corresponding to the updated heading error 670 is different from both a velocity vector calculated from the trajectory heading 675 and a velocity vector calculated from the actual vehicle heading 679.

Referring back to FIG. 4B, the slip angle estimation component 440 receives the curvature of the target trajectory ahead of the autonomous vehicle (e.g., the curvature ahead), the velocity of the autonomous vehicle, and the bank angle of the autonomous vehicle, and generates the slip angle. The slip angle can be calculated according to the following equation:

$$\beta_{veh} = \beta_{on\_level\_road} - \beta_{bank\_angle\_offset}$$

where $\beta_{veh}$ is the slip angle, $\beta_{on\_level\_road}$ is the slip angle of the vehicle on a flat road, and $\beta_{bank\_angle\_offset}$ is a slip angle offset created due to the bank angle of the road upon which the autonomous vehicle is traveling. Said values may be calculated according to the following equations:

$$\beta_{on\_level\_road} \approx p_{\beta,0} c_{traj\_ahead} v^2$$

$$\beta_{bank\_angle\_offset} \approx p_{\beta,\phi} \phi_{veh}$$

where $p_{\beta,0}$ and $p_{\beta,\phi}$ are predetermined tuning factors (e.g., vehicle-dependent factors), $c_{traj\_ahead}$ is the curvature of a point on the target trajectory ahead of the autonomous vehicle, v is the velocity of the autonomous vehicle, and $\phi_{veh}$ is the roll angle of the autonomous vehicle (which approximates the bank angle of the road). The slip angle may be calculated even when the autonomous vehicle is aligned with the target trajectory.

FIG. 7 is a flow diagram of an example method 700 of implementing a lateral controller for autonomous vehicles, according to an embodiment. The steps of the method 700 of FIG. 7 may be executed, for example, by one or more processors of an autonomous vehicle (e.g., the system 150, the system 250, the road analysis module 300, etc.), according to some embodiments. The method 700 shown in FIG. 7 comprises execution steps 710-730. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously with one another.

The method 700 of FIG. 7 is described as being performed by one or more processors of an autonomous vehicle (sometimes referred to as an "autonomous vehicle system"). However, in some embodiments, one or more of the steps may be performed by different processor(s) or any other computing device. For instance, one or more of the steps may be performed via a cloud-based service (e.g., one or more servers) or another processor in communication with the one or more processors of the autonomous vehicle and/or its autonomy system. Although the steps are shown in FIG. 7 as having a particular order, it is intended that the steps may be performed in any order. It is also intended that some of these steps may be optional.

At step 710 of the method 700, the autonomous vehicle system can determine a surrogate trajectory for navigating an autonomous vehicle to a target trajectory. The surrogate trajectory may be determined based on a bank angle of the road, which may be approximated by the autonomous vehicle system by using the roll angle of the autonomous vehicle. To determine the surrogate trajectory, the autonomous vehicle system may perform any of the functionality of the catch-release controller 405 described in connection with FIGS. 4A and 4B. In particular, the autonomous vehicle system can calculate a bank angle correction curvature based the current velocity of the autonomous and the bank angle of the road.

The bank angle correction curvature (sometimes referred to as the "curvature delta") can be calculated by multiplying the velocity by a predetermined curvature parameter, as described herein. The predetermined curvature parameter may be based the characteristics of the autonomous vehicle, and may define in part a curvature that the autonomous vehicle is expected to follow absent steering instructions at the current velocity. Multiplying the predetermined curvature parameter by the current bank angle generates a bank angle correction curvature that the autonomous vehicle is expected to follow absent steering instructions at the current velocity, absent additional steering instructions.

The surrogate trajectory may be determined based on the curvature of the road ahead of the autonomous vehicle and the bank angle correction curvature. By subtracting the bank angle correction curvature from the detected curvature on a point ahead of the autonomous vehicle along a target trajectory (e.g., the trajectory towards which the autonomous vehicle is to be navigated), the surrogate trajectory is produced. The surrogate trajectory can be utilized as the target trajectory to which to navigate the autonomous vehicle when implementing catch-release lateral controller functionality, as described herein.

At step 720 of the method 700, the autonomous vehicle system can generate a curvature target for the autonomous vehicle based on the surrogate trajectory, a lateral error, and a velocity of the autonomous vehicle. To do so, the autonomous vehicle system can perform any of the techniques described in connection with the catch release component 430. As described herein, the lateral error may be an updated lateral error that is determined based on a PID function of the actual lateral error. The actual lateral error may be determined as the distance from a center of the front axle of the autonomous vehicle to the closest point on the target trajectory (or the surrogate trajectory, if generated). The updated lateral error can be utilized to generate a first of at least three points that defined the curvature target. To calculate the updated lateral error, the autonomous vehicle system can execute any of the functionality described in connection with the lateral error PID component 435.

The curvature target (sometimes referred to herein as a "target curvature") a circular path that the autonomous vehicle is to travel to align with the target trajectory. The target curvature may be generated to conform to a shape similar to that depicted in FIG. 5A when the autonomous vehicle system implements a catch phase, and the target curvature may be generated to conform to a shape similar to that depicted in FIG. 5B when the autonomous vehicle system implements a release phase to align the autonomous vehicle with the target trajectory (or the surrogate trajectory, if generated). The autonomous vehicle system may generate a curvature target rate, which can be a rate at which the curvature target changes over time or a rate at which the autonomous vehicle is to travel along the target curvature.

In some implementations, the target curvature may be generated further based on a heading error. The heading error may be a calculated as an angle between the direction that the autonomous vehicle is currently heading (e.g., determined from the pose of the autonomous vehicle) relative to a tangential direction of the target trajectory (or the surrogate trajectory, if generated) at the point on the target trajectory (or the surrogate trajectory, if generated) closest to a predetermined point of the autonomous vehicle. In some implementations, the autonomous vehicle may calculate and utilize an updating heading error instead of the actual heading error.

The updated heading error may be generated to compensate for the bank angle of the road upon which the autonomous vehicle is traveling, which may be approximated by the roll angle of the autonomous vehicle. To do so, the autonomous vehicle system can generate the updated heading error based on an estimation of a slip angle. For example, the autonomous vehicle system can add the actual heading error to the estimation of the slip angle to generate the updated heading error.

The slip angle can be angle that the autonomous vehicle needs to drive at to drive straight on a road given a particular bank angle and velocity. The slip angle may therefore be calculated based on based on the velocity of the autonomous vehicle and the bank angle of the road upon which the autonomous vehicle is operating. To calculate the slip angle, the autonomous vehicle system can implement any of the functionality of the slip angle estimation component 440 described in connection with FIG. 4B. The slip angle may be calculated based on predetermined tuning factors, which may be specific to how the autonomous vehicle is affected by the bank angle of different roads.

At step 730 of the method 700, the autonomous vehicle system can navigate the autonomous vehicle according to the curvature target. Navigating the autonomous vehicle according to the curvature target can include generating a steering command for the autonomous vehicle based on the curvature target. To generate the steering command, the autonomous vehicle system can utilize an inverse model of the autonomous vehicle, as described in connection with FIG. 4A. The inverse model may be executed using the curvature target (and in some implementations, the curvature target rate) generated by the autonomous vehicle system as input. The inverse model can generate the steering command to translate the target curvature into an actuation of the steering system of the autonomous vehicle.

The steering command can cause the autonomous vehicle to move along the target curvature and begin to align with the target trajectory. The steps of the method 700 may be performed iteratively, with new target curvatures being generated as the pose and velocity of the autonomous vehicle is updated based on the generated steering commands. In some implementations, the target curvatures may be generated in a shape corresponding to the catch phase or the release phase based on the heading of the autonomous vehicle with respect to the curvature of the target trajectory or the surrogate trajectory.

In some implementations, the autonomous vehicle system can perform the steps of the method 700 at a predetermined rate, for example, once every ten milliseconds, once every twenty milliseconds, or once every 30 milliseconds, among others. Continuously executing and updating the curvature target for the autonomous vehicle system can enable the autonomous vehicle to be navigated to and along a target trajectory, without overshooting the target trajectory. Reducing the overshooting may be implemented by switching from a catch phase curvature to a release phase curvature once the heading of the autonomous vehicle is directed towards the target trajectory or surrogate trajectory.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and algorithm steps have been described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:

determining, by one or more processors coupled to a non-transitory memory, a target trajectory in which to maintain an autonomous vehicle while traveling, the target trajectory corresponding to a desired actual travel path for the autonomous vehicle;

identifying, by the one or more processors, a point along the target trajectory closest to a current position of the autonomous vehicle;

determining, by the one or more processors, a lateral error is present between the current position of the autonomous vehicle and the point along the target trajectory closest to the current position of the autonomous vehicle;

in response to determining the lateral error is present, determining, by the one or more processors, a surrogate trajectory for navigating the autonomous vehicle towards the determined target trajectory, the surrogate trajectory distinct at least in part from the target trajectory and including the point along the target trajectory closest to the current position of the autonomous vehicle;

generating, by the one or more processors, a curvature target for the autonomous vehicle based on the surrogate trajectory, the lateral error, and a velocity of the autonomous vehicle, the curvature target defined in part by at least three points; and navigating, by the one or more processors, the autonomous vehicle according to the curvature target.

2. The method of claim 1, wherein the curvature target is generated further based on a heading error.

3. The method of claim 2, wherein the heading error is calculated based on an estimation of a slip angle.

4. The method of claim 3, wherein the slip angle is estimated based on the velocity of the autonomous vehicle, a curvature of the target trajectory, and a bank angle of a road upon which the autonomous vehicle is operating.

5. The method of claim 1, wherein the surrogate trajectory is determined based on a bank angle of a road upon which the autonomous vehicle is operating.

6. The method of claim 5, wherein the surrogate trajectory is determined further based on a curvature of the road or a curvature of the target trajectory ahead of the autonomous vehicle.

7. The method of claim 1, further comprising generating, by the one or more processors, a steering command for the autonomous vehicle based on the curvature target.

8. The method of claim 1, wherein navigating the autonomous vehicle comprises causing the autonomous vehicle to align with the target trajectory.

9. The method of claim 1, wherein the lateral error is determined based on a proportional-integral-differential (PID) function.

10. The method of claim 1, wherein the lateral error is determined relative to front axle or a reference point along a longitudinal axis of the autonomous vehicle.

11. A system, comprising:

one or more processors coupled to memory, the one or more processors configured to:

determine a target trajectory in which to maintain an autonomous vehicle while traveling, the target trajectory corresponding to a desired actual travel path for the autonomous vehicle;

identify a point along the target trajectory closest to a current position of the autonomous vehicle;

determine a lateral error is present between the current position of the autonomous vehicle and the point along the target trajectory closest to the current position of the autonomous vehicle;

in response to determining the lateral error is present, determine a surrogate trajectory for navigating the autonomous vehicle towards the determined target trajectory, the surrogate trajectory distinct at least in part from the target trajectory and including the point along the target trajectory closest to the current position of the autonomous vehicle;

generate a curvature target for the autonomous vehicle based on the surrogate trajectory, a lateral error, and a velocity of the autonomous vehicle, the curvature target defined in part by at least three points; and navigate the autonomous vehicle according to the curvature target.

12. The system of claim 11, wherein the curvature target is generated further based on a heading error.

13. The system of claim 12, wherein the heading error is calculated based on an estimation of a slip angle.

14. The system of claim 13, wherein the slip angle is estimated based on the velocity of the autonomous vehicle, a curvature of the target trajectory, and a bank angle of a road upon which the autonomous vehicle is operating.

15. The system of claim 11, wherein the surrogate trajectory is determined based on a bank angle of a road upon which the autonomous vehicle is operating.

16. The system of claim 15, wherein the surrogate trajectory is determined further based on a curvature of the road or a curvature of the target trajectory ahead of the autonomous vehicle.

17. The system of claim 11, wherein the one or more processors are further configured to generate a steering command for the autonomous vehicle based on the curvature target.

18. The system of claim 11, wherein the one or more processors are further configured to navigate the autonomous vehicle comprises by causing the autonomous vehicle to align with the target trajectory.

19. The system of claim 11, wherein the lateral error is determined based on a proportional-integral-differential (PID) function.

20. The system of claim 11, wherein the lateral error is determined relative to front axle or a reference point along a longitudinal axis of the autonomous vehicle.

* * * * *